United States Patent [19]

Archer

[11] 4,428,711

[45] Jan. 31, 1984

[54] UTILIZATION OF WIND ENERGY

[75] Inventor: John D. Archer, Coopersdal, Komatiepoort District, Transvaal, South Africa

[73] Assignee: John David Archer, Coopersdal, South Africa

[21] Appl. No.: 323,386

[22] Filed: Nov. 20, 1981

Related U.S. Application Data

[63] Continuation-in-part of Ser. No. 174,619, Aug. 1, 1980, abandoned.

[30] Foreign Application Priority Data

Aug. 7, 1979 [ZA] South Africa ............... 79/4077

[51] Int. Cl.³ .................................... F03D 1/04
[52] U.S. Cl. ........................ 415/2 A; 415/DIG. 1; 415/1
[58] Field of Search ................... 415/2 R–4, 415/DIG. 1, 1

[56] References Cited

U.S. PATENT DOCUMENTS

| | | | |
|---|---|---|---|
| 1,413,411 | 4/1922 | Lloyd et al. | 415/156 |
| 4,045,144 | 8/1977 | Loth | 415/DIG. 1 X |
| 4,047,832 | 9/1977 | Sforza | 415/2 A X |
| 4,105,362 | 8/1978 | Sforza | 415/2 A |
| 4,156,580 | 5/1979 | Pohl | 415/2 R |
| 4,172,574 | 10/1979 | Spillman | 415/DIG. 1 X |
| 4,222,242 | 9/1980 | Moseley | 415/2 R X |

FOREIGN PATENT DOCUMENTS 821930  11/1951  Fed. Rep. of Germany ........ 416/60

Primary Examiner—Everette Powell, Jr.
Attorney, Agent, or Firm—Hammond & Littell, Weissenberger and Muserlian

[57] ABSTRACT

A wind energy device comprising a first airfoil having a leading edge, a trailing edge and a tip, means supporting the airfoil above a surface, the airfoil being adapted, when traversed by a prevailing wind, to generate a vortex at its tip, an air deflector associated with the airfoil and arranged so as to deflect prevailing wind traversing the deflector into the vortex to augment the energy of the vortex, means to vary the orientation of the airfoil relative to the prevailing wind, and a rotary device located in the path of the vortex and adapted to be driven by the wind in the vortex.

23 Claims, 8 Drawing Figures

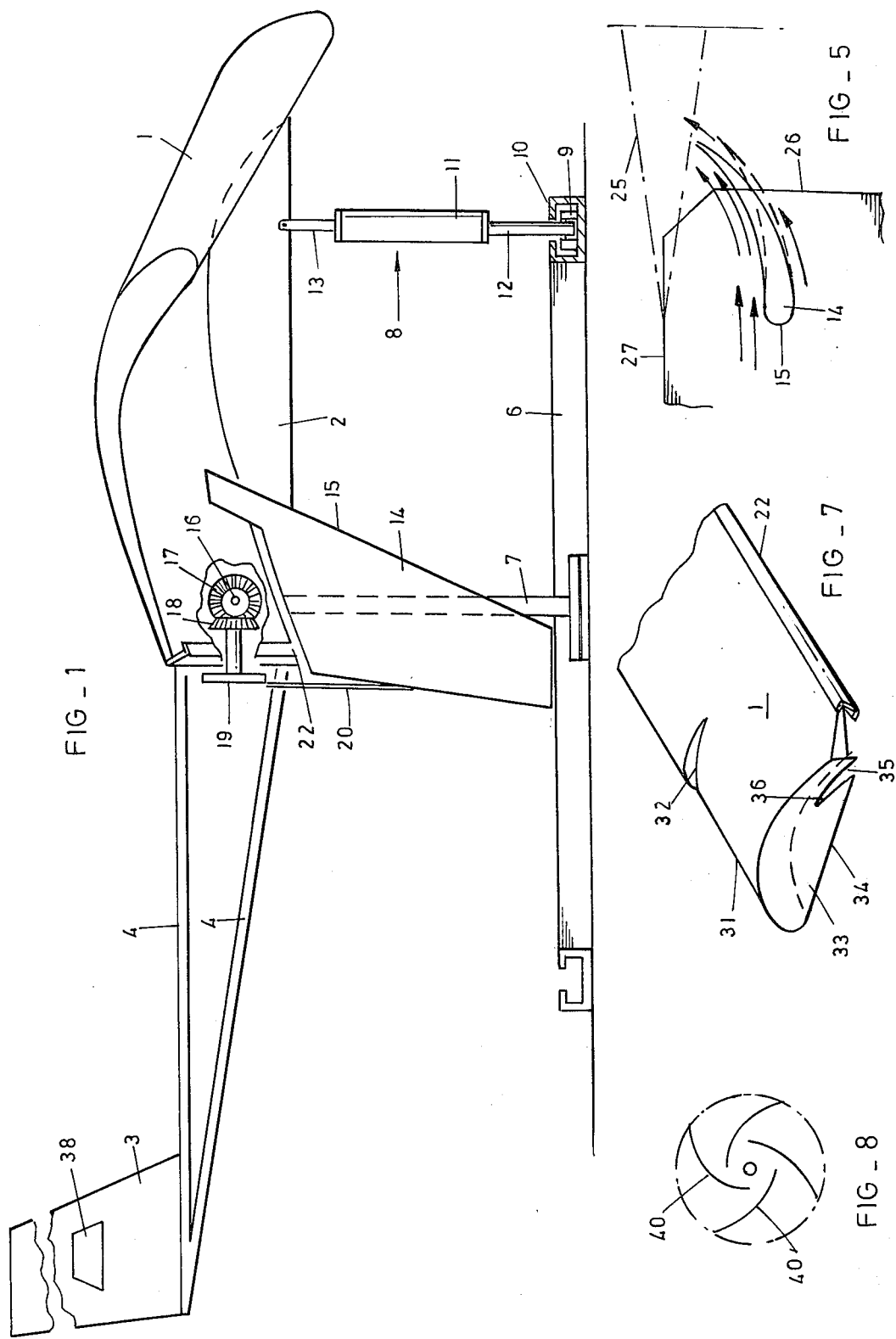

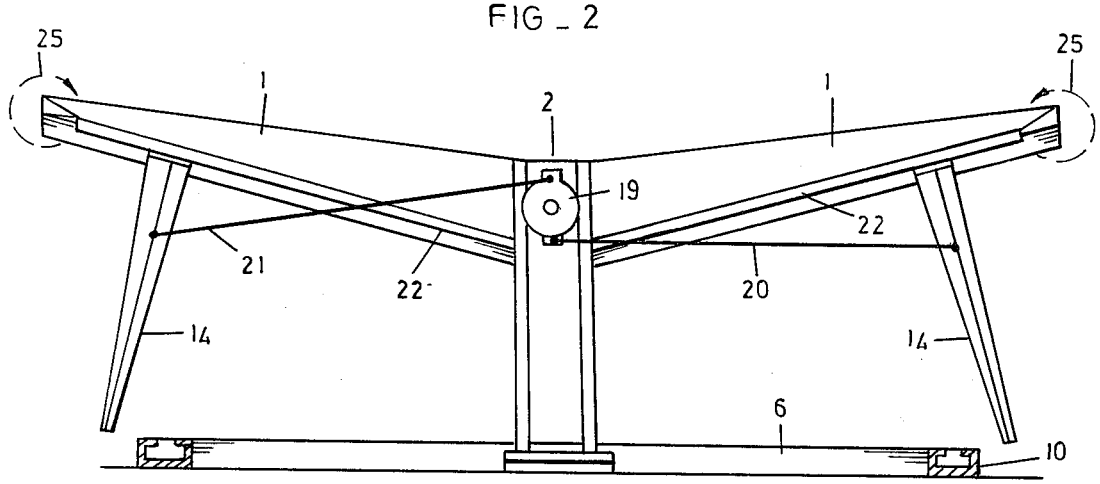
FIG_2
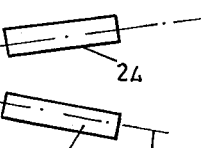
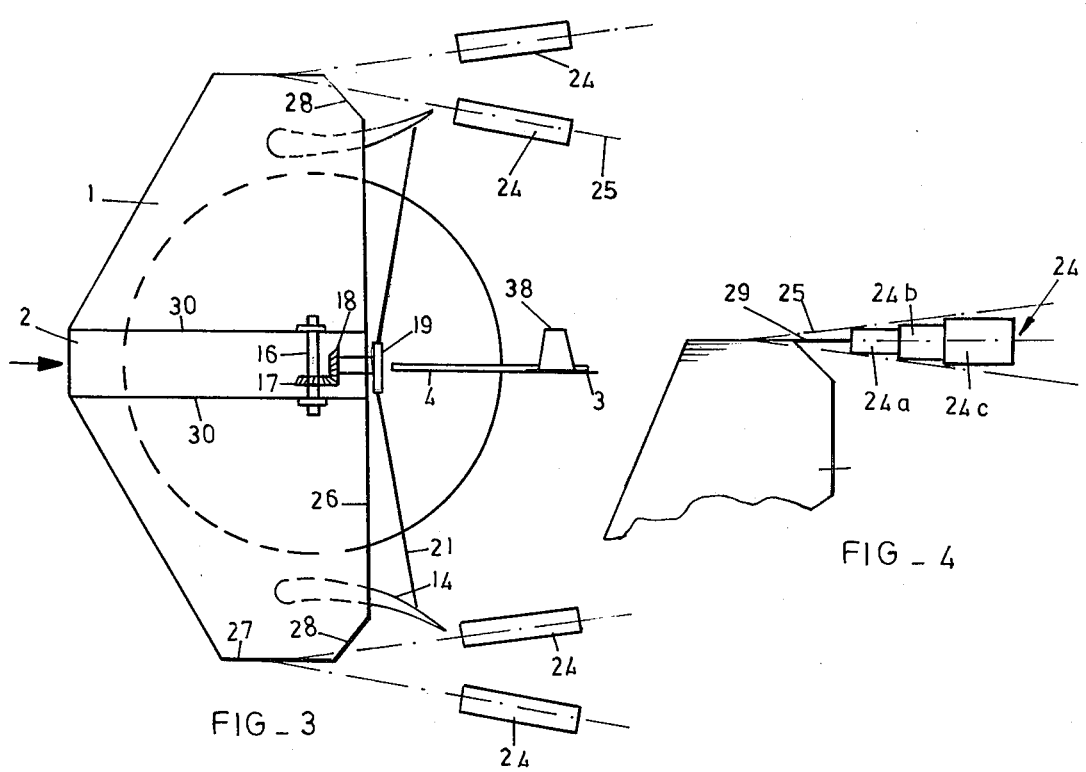
FIG_4
FIG_3
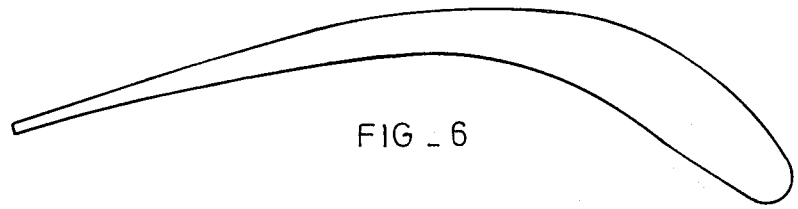
FIG_6

UTILIZATION OF WIND ENERGY

CROSS REFERENCE TO RELATED APPLICATIONS

This application is a continuation-in-part of applicant's copending application Ser. No. 174,619 filed Aug. 1, 1980, now abandoned, the priority of which is hereby claimed.

BACKGROUND OF THE INVENTION

This invention relates to the utilisation of wind energy for the purpose of generating mechanical energy which can be used directly to drive machines or can be converted to other forms of energy such as electrical energy.

Wind energy is a theoretically attractive source of man's energy requirements because the wind is universal and free and because it occupies a high position in the chain of energy conversion processes that start with the arrival of the sun's rays on the earth.

Although it has been exploited industrially for millenia, wind energy suffers from several disadvantages in relation to current-day patterns of energy requirements. Although the wind possesses vast quantities of energy, this energy is present in a relatively attenuated form and mechanically large devices, extracting energy over a correspondingly large surface, are required if meaningful quantities of energy are to be obtained from it. Further, it is sporadic in nature, and over large parts of the earth's surface is subject to a cyclical pattern in which the wind rises during the sunlight hours and subsides in the evening. Since the inertia of most wind-driven devices is substantial, it is often thought that low-speed winds, such as occur in the early and late sunrise hours before and after the main hours of wind, are not useful for industrial purposes. Moreover, being highly directional, the wind is inherently unsuitable for driving large bodies since the orientation of these bodies must normally change with the wind if they are to operate efficiently.

PRIOR ART

It is known to create a wind vortex and then to place a rotary member in the vortex so created so that the wind energy concentrated in the vortex can be extracted. Such systems are shown in U.S. Pat. No. 4,045,144 to Loth and U.S. Pat. Nos. 4,105,362 and 4,111,594 to Sforza. In both the Sforza specifications, the vortices created are leading edge separation vortices created by wind flowing over the sharp edges of a slim delta plan form. The vortices created in this manner are less concentrated than is desirable. A rotary device is simply placed in the path of the vortex, without any attempt to boost the energy within the vortex. Furthermore, in the construction of specification U.S. Pat. No. 4,105,362, the two vortices which are produced would be in danger of interfering with one another to cancel one another out, in view of their close proximity.

The Loth specification U.S. Pat. No. 4,045,144 discloses the use of a wing tip vortex to concentrate wind energy from a large area. No attempt is made to augment the energy in the vortex, in order to increase the output from the device. Loth discloses the use of propellors i.e. a type of horizontal-axis rotor, to extract energy from the vortex. In an article in the Journal of Energy, volume 2 number 4 July–August 1978, Loth discusses this type of arrangement and comes to the conclusion, at the top of the first column on page 217, that the energy in the vortex cannot be harnessed by a wind machine.

SUMMARY OF THE INVENTION

According to the present invention, there is provided a wind energy device comprising an air foil having a leading edge, a trailing edge and a tip, the air foil being supported above a surface and being adapted, when traversed by prevailing wind to generate a vortex at its tip, an air deflector associated with the air foil and arranged so as to deflect prevailing wind traversing the deflector into the vortex to augment the energy of the vortex, means to vary the orientation of the air foil relative to the prevailling wind, and a rotary device located in the path of the vortex and adapted to be driven by the wind in the vortex.

The use of an air deflector to deflect additional wind into the vortex makes a substantial contribution to the volume of wind moving at high speed in the vortex and thus the energy which can be extracted from the vortex.

The rotary device is preferably a vertical axis rotary device. Such vertical axis rotary devices can be distinguished from horizontal axis devices in that in a vertical axis device the device axis is generally normal to the incident wind, whilst in a horizontal axis device the device axis is generally parallel to the incident wind. The word "vertical" in this context conveys no limitation as to the arrangement in space of the device, but is merely used as a conventional term of the art to describe the type of device.

My studies indicate that the use of a vertical-axis rotor will enable wind energy to be extracted from the vortex. The rotary device can be arranged either on the axis of the vortex or, preferably, offset from the vortex axis. A preferred form of vertical axis rotary device is a Savonius rotor.

Further preferable features of the invention will be set forth in the appended claims.

BRIEF DESCRIPTION OF THE DRAWINGS

The invention will now be further described, by way of example, with reference to the accompanying drawings, in which:

FIG. 1 is a side view of a device according to the invention;

FIG. 2 is a rear view of the device shown in FIG. 1, with the guide vane omitted;

FIG. 3 is a plan view of the device shown in FIGS. 1 and 2 with a first type of rotary device;

FIG. 4 is a plan view of a part of the device shown in FIGS. 1 and 2 with a second type of rotary device;

FIG. 5 is a schematic view of a portion of the device showing the air flow over that portion;

FIG. 6 is a cross section through the main air foil;

FIG. 7 is a perspective view of the outer end of the main air foil; and

FIG. 8 is an end view of a rotor for use in the device of the invention.

DESCRIPTION OF PREFERRED EMBODIMENTS

FIG. 1 shows one side only of a wind energy device. The other side will be a mirror image of the side shown, and the same reference numerals will be used. The device has a first or main air foil 1 mounted on a central support 2. The support 2 carries a vane 3 at the end of outrigger arms 4, and the whole device can rotate on a base 6 about a central pillar 7, in response to changes in the wind direction. The bottom of the pillar 7 includes a bearing to permit this rotational movement. Because the main air foil 1 will tend to lift as it is traversed by a prevailing wind, a strut 8 is provided between the supporting member 2 and the base 6. The bottom of the strut 8 carries rollers 9 running in a track 10 which permit the necessary rotational movement without allowing the air foil to lift. It is however necessary to raise and lower the leading edge of the air foil 1 to vary the angle of attack for maximum efficiency as the wind strength changes. To permit this adjustment, the strut 8 includes a cylinder 11, and piston rods 12, 13 of pistons inside the cylinder project from either end and can be extended or retracted.

The track 10 of the base 6 extends in a full 360° circle around the pillar 7.

The force of the wind on the vane 3 should be sufficient to turn the device into the correct orientation relative to the wind direction.

Suspended from the underside of the main air foil 1 is a second or auxiliary air foil 14. This is pivoted to the under surface of the main air foil 1 about a pivot axis coincident with its leading edge 15. The upper surface of the second air foil 14 is cut away immediately adjacent the underside of air foil 1 in order to permit air to flow along the length of the air foil 1.

When the strut 8 is extended or retracted to raise or lower the front edge of the air foil 1, the supporting body 2 on which the air foil 1 is mounted pivots about a pivot point 16. A bevel gear 17 is mounted on the supporting body 2, and a further bevel gear 18 engages with the gear 17. Therefore, as the body 2 is raised or lowered the bevel gear 18 is rotated and in turn turns an actuating disc 19. Rods 20 and 21 (see FIG. 2) are fixed to the disc 19, and it will be seen that as the disc 19 rotates, the two air foils 14 are turned about the pivot axes running along their forward edges.

The main air foil 1 has a barrier channel section 22 running along its trailing edge, for reasons which will become apparent later.

Looking now at FIG. 3, it will be seen that Savonius rotor units, generally designated 24, are mounted downstream of the air foils 1 behind the tips of the air foils. The rotor units are mounted away from the core of the vortex, and are arranged so that they lie at the edges of the vortices 25 as shown with their axes arranged along the conical shape formed by the vortex. The wind in the vortex will have a component of movement along the vortex axis and also a component of movement at right angles to this axis. The component acting at right angles to the vortex axis will also be generally at right angles to the rotor axis, so that the rotors will act in the conventional manner for vertical-axis rotor types.

In an alternative embodiment the rotor units 24 may be placed with their axes coincident with the vortex axes. For example the rotor units may consist, as shown in FIG. 4, of three co-axial Savonius rotors 24a, 24b, 24c, the sizes of which are chosen in accordance with the dimensions of the conical vortex produced.

The corners of the air foil where the trailing edge 26 meets the tip 27 are cut away at 28 to permit the rotor units 24 to be positioned close to the source of the vortex. The rotor units 24 are mounted on the air foil tips by means of a rigid link 29, and can be raised or lowered relative to the air foil section in such a way that they remain positioned in the center of the vortex.

FIG. 8 is an end view of a Savonius rotor, which consists of a series of vanes 40 arranged generally as illustrated with their outer edges in a cylindrical surface and their inner edges overlapping each other.

THEORY OF OPERATION

The design of the air foil sections 1 is generally contrary to conventional aerodynamic practice. In designing wings for aircraft, it is desirable to minimise the tip vortex produced. In contrast, in the present invention it is advantageous to maximise the vortex, because the creation of the vortex is being used as a way of concentrating wind energy, which can subsequently be extracted. Thus, the air foils 1 are preferably low aspect-ratio, slow-speed, high-lift sections. FIG. 6 shows a typical air foil section having these properties, and the coordinates of this air foil are given in Table 1. The preferred aspect ratio will be apparent from FIG. 3.

Firstly, a relatively large dihedral angle is used. Thirteen degrees is a preferred angle, and this is larger than would be used in a aeroplane. It will be immediately apparent that raising the tips of the air foils above the roots will increase the spanwise flow of air.

Secondly, channel 22 is provided along the trailing edge of the air foils. The wind passing over the high pressure under surface of the air foil will tend to be deflected towards the air foil tip when it meets this channel section 22.

Thirdly, the leading edge 31 of the air foil has a backward step 32 along its length. The step is such that the leading edge of the air foil on the tip side of the step is set back from the leading edge on the root side of the step. Because the air foil used in this device has a large camber, there may be tendency for the wind passing over the upper surface to break away from the air foil section. The step 32 helps to prevent this breaking away by allowing high pressure air to spill over from the bottom surface to the top surface to re-energise decay in laminar flow on the top surface.

The effect of the axiliary air foils 14 is shown in FIG. 4. In this figure, the edges of the vortex are indicated at 25, and it will be seen that wind incident on the leading edge 15 of the auxiliary wing 14 is deflected into the vortex 25. When an air foil section 14 is used, as shown, the downwash effect from the air foil will all be fed into the vortex. The angle of the air foil 14 can be adjusted, and two different positions are indicated in FIG. 4 by solid lines and dotted lines respectively. The wind deflected by the air foil 14 should be fed into the vortex generally tangentially and in the direction of rotation of the vortex. The direction of rotation of the vortices will be apparent from FIG. 2 and it will therefore be clear that auxiliary air foils located beneath the main air foils 1 should deflect wind generally outwards.

It would also be possible to have auxiliary air foils mounted above the main air foils 1; however such upper auxiliary air foils should be oppositely directed so that they deflect wind towards the center of the device and thereby draw wind in a sideways direction into the top half of the vortex.

It may also be advantageous to provide some form of heating below the tips of the main air foils. If the wind passing below the air foil tips is heated, the pressure will increase and lead to increased energy in the vortex.

A further feature of the device is shown in FIG. 7. This feature is not shown in any of the other drawings, but consists in mounting a plate 33 at the tip of the air foil 1, with the bottom edge 34 of the plate extending between the lower extremities of the leading and trailing edges. The plate 33 also has a slot 35, and it is hoped that the end 36 of this slot will provide a point source for the vortex, where the high pressure air from the underside of the wing will be able to escape and meet the low pressure air on the upper side of the wing. The slot 35 can be of different shape from that shown, and in particular may simply be a hole (of adjustable size) in a similar position to the end 36 of a slot 35 shown in FIG. 7. The slot 35 of the shape shown may be provided with a series of spring-loaded covers which will be opened sequentially by the air pressure under the air foil 1. It is important that the plates 33 should be retractable, since they must be removed when the vortices first form at the tips, and will only be lowered into position once the vortices are established.

It may be possible to use non-air foil deflector plates instead of the auxiliary air foils 14. All that is required of these members is that they should deflect the incident wind sideways into the vortex, and this could be done by a simple plate. However, an air foil is preferred since the thickness of the member allows it to be structurally relatively strong, and also because the downwash from an air foil will originate from both sides of the air foil since the wind follows the air foil surface on both sides, whereas the downwash from a simple deflector plate would come from one side only of the plate.

Many constructional materials are possible for the air foils 1, but it is considered that concrete may ultimately be the most suitable material, because of its low cost. The weight of concrete would be an advantage rather than a disadvantage, because this will assist other measures which will have to be taken to secure the device to the ground, to prevent the lift generated by the air foils from lifting the device into the air.

Hydraulic means may be provided to automatically vary the angle of attack of the main air foils 1 in accordance with the wind speed.

A horizontal vane 38 may be provided on the vane 3, and up and down movement of the vane 38 can be used to move the rotor units 24 up and down relative to the air foils 1.

In gale or storm force winds, the device will be closed down, i.e. the leading edge of the air foils 1 will be brought as close to the ground as possible. In these conditions, the rotor units 24 can be arranged so that they flip up, to bring their axis vertical. The rotors then rotate in the wind in a manner which is conventional for Savonius rotors.

In light winds, the leading edge of the air foil 1 will be raised to its maximum position, and will then be lowered as the wind strength increases.

The auxiliary air foils 14 are conveniently mounted at right angles to the main air foils 1.

It would be possible to construct the device with the air foils upside down when compared with the orientation shown in the Figures. This could have certain advantages.

For some applications of the invention the vanes in different sections of the rotor may be staggered or offset in order to smooth the torque curve. The vanes may also taper in the longitudinal direction to fit more precisely into the conical space of the vortex. While the Savonius rotors are particularly suitable rotary devices for the purposes of the invention, other vertical-axis rotary devices could also be used.

Because the device concentrates wind energy in a small area, relatively low wind speeds, which cannot be harnessed by a conventional windmill, can be used to turn the rotors situated in the tip vortices.

The device may be as large or as small as circumstances require, but will naturally become cumbersome and difficult to anchor if it is unduly large. However it is considered that a device with an air foil span of about 6 meters will suffice to generate the electrical power needed to supply a farm of substantial size or at least a large domestic load.

Any suitable electricity generating device can be connected to the rotors to produce electricity from the rotary movement of the rotors. It is considered best to mount hydraulic pumps at the wing tips to be directly driven by the rotors, with the fluid inlet and outlet from the pump flowing in a circuit to operate an electricity generator. The pumps could be housed in the air flow sections 1 near the tips thereof, and mechanically connected to the rotor units 24. Alternatively, a generator such as an alternator could be mounted on the axis of the rotor unit at any convenient point to produce electricity directly.

Since the wind is not a continuous source of energy, it is desirable to associate with a wind energy device some form of energy storage system. Excess energy generated when the wind is blowing can be used to perform mechanical work which can then be used when the wind is not blowing to generate electricity. For example, a very large flywheel can be driven, gas could be compressed, fluids could be pumped uphill. Alternatively, the electricity could be used to charge batteries. These suggestions, for storing energy are not intended to be exhaustive, and any known methods could be used.

TABLE 1

| Station | Upper Surface as % of Chord | Lower Surface as % of Chord |
|---|---|---|
| 0 | −4.59 | −6.31 |
| 1 | −1.02 | −7.94 |
| 2 | +1.17 | −8.13 |
| 3 | +2.82 | −8.06 |
| 4 | +4.19 | −7.77 |
| 5 | +5.37 | −7.29 |
| 6 | +6.38 | −6.77 |
| 8 | +8.35 | −5.57 |
| 10 | +9.95 | −4.32 |
| 15 | +13.12 | −0.81 |
| 20 | +15.15 | +3.30 |
| 25 | +16.46 | +6.86 |
| 30 | +17.38 | +9.57 |
| 35 | +17.83 | +11.10 |
| 40 | +17.96 | +11.90 |
| 45 | +17.72 | +11.94 |
| 50 | +16.94 | +11.63 |
| 60 | +14.57 | +10.36 |
| 70 | +11.50 | +8.55 |
| 80 | +8.46 | +6.14 |
| 90 | +5.08 | +3.23 |
| 100 | +1.12 | +0.00 |

I claim:

1. A wind energy device comprising a first airfoil having a major axis, a leading edge, a trailing edge, and a tip, the first airfoil being supported above a surface and being adapted, when traversed by a prevailing wind, to generate a vortex at its tip, means to vary the orientation of the airfoil relative to the prevailing wind, and a rotary device located in the path of the vortex and adapted to be driven by the wind in the vortex, including a second airfoil having a major axis generally transverse to the major axis of the first airfoil and arrranged so that its downwash effect augments the energy of the vortex.

2. A device as claimed in claim 1, wherein the first airfoil is a low aspect-ratio, slow-speed, high-lift airfoil.

3. A device as claimed in claim 1, wherein the second airfoil has a leading edge and a trailing edge and adjustment means are provided to vary the angle between a line joining the leading and trailing edges and the axis of the vortex generated at the first airfoil tip.

4. A device as claimed in claim 3, wherein said adjustment means automatically adjusts the angle of attack of the second airfoil when the angle of attack of the first airfoil is varied.

5. A device as claimed in claim 3, wherein the second airfoil is hinged to the first airfoil about an axis extending along the leading edge of the second airfoil.

6. A device as claimed in claim 3, wherein the second airfoil is cut away adjacent the first airfoil to permit spanwise flow along the first airfoil.

7. A device as claimed in claim 3, wherein the second airfoil is a low aspect-ratio, slow-speed, high-lift airfoil.

8. A device as claimed in claim 1, wherein the rotary device is a vertical axis rotary device.

9. A device as claimed in claim 1, wherein the rotary device includes at least one Savonius rotor arranged with its axis substantially parallel to a generatrix of the conical shape of the vortex.

10. A device as claimed in claim 1, wherein the rotary device is a Savonius rotor arranged with its axis in a position where, in use, the axis of the vortex will lie.

11. A device as claimed in claim 1, wherein the trailing edge of the first airfoil has a barrier wall forming a barrier to airflow across the airfoil on the high pressure side thereof.

12. A device as claimed in claim 1, wherein the first airfoil has a dihedral angle larger than the dihedral angle used for an aeroplane.

13. A device as claimed in claim 12, wherein the dihedral angle is 13° or more.

14. A device as claimed in claim 1, wherein the corner of the first airfoil formed by the trailing edge and the tip is cut away, so that the rotary device can be placed as close as possible to the origin of the tip vortex.

15. A device as claimed in claim 1, wherein a plate having an aperture therethrough closes the high pressure side of the airfoil at the tip, the aperture enabling air to escape from the high pressure side to the low pressure side of the airfoil in order to define the origin of the tip vortex.

16. A device as claimed in claim 15, wherein said plate comprises means to adjust the size of the aperture.

17. A device as claimed in claim 1, wherein the first airfoil includes a step in its leading edge, the step being such that the leading edge on the side of the step nearer the tip is set back relative to the leading edge on the side of the step nearer the root.

18. A device as claimed in claim 1, wherein the rotary device is attached to the airfoil tip at the trailing edge, and means are provided for adjusting its position relative to the airfoil.

19. A device as claimed in claim 1, wherein an air deflector is provided on the low pressure side of the first airfoil, said air deflector being adapted to deflect wind away from the air foil tip.

20. A device as claimed in claim 1, including two first airfoils arranged symmetrically to one another with their roots adjacent and their tips remote from one another.

21. A device as claimed in claim 1, wherein the first airfoil profile is substantially as defined by the co-ordinates of the following Table:

| Station | Upper Surface as % of Chord | Lower Surface as % of Chord |
| --- | --- | --- |
| 0 | −4.59 | −6.31 |
| 1 | −1.02 | −7.94 |
| 2 | +1.17 | −8.13 |
| 3 | +2.82 | −8.06 |
| 4 | +4.19 | −7.77 |
| 5 | +5.37 | −7.29 |
| 6 | +6.38 | −6.77 |
| 8 | +8.35 | −5.57 |
| 10 | +9.95 | −4.32 |
| 15 | +13.12 | −0.81 |
| 20 | +15.15 | +3.30 |
| 25 | +16.46 | +6.86 |
| 30 | +17.38 | +9.57 |
| 35 | +17.83 | +11.10 |
| 40 | +17.96 | +11.90 |
| 45 | +17.72 | +11.94 |
| 50 | +16.94 | +11.63 |
| 60 | +14.57 | +10.36 |
| 70 | +11.50 | +8.55 |
| 80 | +8.46 | +6.14 |
| 90 | +5.08 | +3.23 |
| 100 | +1.12 | +0.00 |

22. A method of concentrating wind energy, comprising the steps of placing a first airfoil having a major axis, a leading edge, a trailing edge and a tip in a prevailing wind with the wind direction being substantially parallel to a chord of the first airfoil so that a vortex is generated at the tip of the first airfoil, deflecting wind, by a second airfoil positioned generally traverse to the major axis of the first airfoil, from a position adjacent the airfoil tip into the vortex, mounting a rotary device in the vortex so formed so that the rotary device is driven by the vortex, and using the rotation of the rotary device to generate power.

23. A method as claimed in claim 22, including the step of applying heat to the high pressure side of the first airfoil adjacent the tip thereof.

* * * * *